United States Patent
Ahn et al.

(10) Patent No.: US 10,046,277 B2
(45) Date of Patent: Aug. 14, 2018

(54) HOLLOW FIBER MEMBRANE MODULE AND METHOD FOR PREPARING THE SAME

(71) Applicant: Cheil Industries Inc., Gumi-si, Gyeongsangbuk-do (KR)

(72) Inventors: Hyoung Wook Ahn, Uiwang-si (KR); Young Lim Koo, Uiwang-si (KR)

(73) Assignees: LOTTE ADVANCED MATERIALS CO., LTD., Yeosu-si, Jeollanam-do (KR); LOTTE CHEMICAL CORPORATION, Seoul (KR)

( * ) Notice: Subject to any disclaimer, the term of this patent is extended or adjusted under 35 U.S.C. 154(b) by 221 days.

(21) Appl. No.: 14/040,416

(22) Filed: Sep. 27, 2013

(65) Prior Publication Data
US 2014/0102971 A1 Apr. 17, 2014

(30) Foreign Application Priority Data
Oct. 17, 2012 (KR) .......... 10-2012-0115665

(51) Int. Cl.
*B01D 63/02* (2006.01)

(52) U.S. Cl.
CPC ......... *B01D 63/024* (2013.01); *B01D 63/021* (2013.01); *B01D 63/022* (2013.01); *B01D 2313/21* (2013.01)

(58) Field of Classification Search
CPC ........ B01D 63/02; B01D 63/21; B01D 63/22; B01D 63/024; B01D 2319/04;
(Continued)

(56) References Cited

U.S. PATENT DOCUMENTS 4,414,110 A * 11/1983 Geel ................. B01D 63/02
                                                  210/321.8
5,238,561 A *  8/1993 Sanda .............. B01D 61/30
                                                  210/321.8
(Continued)

FOREIGN PATENT DOCUMENTS

CN        1345255 A    4/2002
CN      101198397 A    6/2008
(Continued)

OTHER PUBLICATIONS

Office action in corresponding Korean Patent Application No. 10-2012-0115665, Office action dated Oct. 15, 2014 (7 pgs.).
(Continued)

*Primary Examiner* — Pranav N Patel
(74) *Attorney, Agent, or Firm* — Lewis Roca Rothgerber Christie LLP

(57) ABSTRACT

A hollow fiber membrane module and a method for preparing a hollow fiber membrane module. A hollow fiber membrane module includes a header, and a sheet block inserted into the header, and the sheet block includes a hollow fiber membrane block, wherein the hollow fiber membrane block comprises a plurality of hollow fiber membranes arranged at regular intervals in a vertical direction of the header; and a resin block formed at an end of the hollow fiber membrane blocks and contacting an inner wall of the header to be secured thereto, and a potting agent is filled between hollow fiber membranes of the hollow fiber membrane blocks in a space between an upper side of the resin block to an inlet of the header to secure the hollow fiber membranes.

16 Claims, 6 Drawing Sheets

(58) Field of Classification Search
CPC ............... B01D 69/08; B01D 2313/21; B01D 2313/04; B01D 2201/043; B01D 2201/0438; B01D 2201/0446; B01D 2201/0453
See application file for complete search history.

(56) References Cited

U.S. PATENT DOCUMENTS

| | | | | |
|---|---|---|---|---|
| 2001/0037967 | A1* | 11/2001 | Rabie | B01D 63/021 210/321.8 |
| 2002/0153299 | A1 | 10/2002 | Mahendran et al. | |
| 2005/0051481 | A1 | 3/2005 | Husain et al. | |
| 2006/0113226 | A1* | 6/2006 | Breitner | B01D 63/02 210/95 |
| 2006/0151373 | A1* | 7/2006 | Szabo | B01D 63/022 210/321.61 |
| 2009/0026140 | A1* | 1/2009 | Wu | B01D 61/20 210/650 |
| 2009/0218274 | A1* | 9/2009 | Sakashita | B01D 63/02 210/321.6 |
| 2009/0301959 | A1* | 12/2009 | Tada | B01D 63/021 210/321.87 |
| 2010/0000938 | A1* | 1/2010 | Szabo | B01D 63/022 210/496 |
| 2010/0000939 | A1* | 1/2010 | Ishibashi | B01D 63/02 210/500.23 |
| 2010/0038301 | A1* | 2/2010 | Lee | B01D 63/022 210/321.6 |

FOREIGN PATENT DOCUMENTS

| | | |
|---|---|---|
| CN | 101288828 A | 10/2008 |
| CN | 101668581 A | 3/2010 |
| KR | 10-2005-0102115 A | 10/2005 |
| KR | 10-2008-0012822 A | 2/2008 |
| KR | 10-2011-0127774 A | 11/2011 |
| WO | WO 2006/045191 A1 | 5/2006 |
| WO | WO 2008/133430 A1 | 11/2008 |

OTHER PUBLICATIONS

Office action in corresponding Chinese Patent Application No. 201310487904.7, Office action dated Mar. 30, 2015 with English translation (24 pgs.).

European Search Report for corresponding European Application No. 13187373.9-1356, Applicant, Cheil Industries Inc., European Search Report dated Jan. 16, 2014 and mailed Jan. 23, 2014 (8 pgs.).

* cited by examiner (a)

(b)

Surface A

HOLLOW FIBER MEMBRANE MODULE AND METHOD FOR PREPARING THE SAME

CROSS-REFERENCE TO RELATED APPLICATION

This application claims priority to and the benefit of Republic of Korea Patent Application Number 10-2012-0115665, filed on Oct. 17, 2012 in the Korean Intellectual Property Office, the entire content of which is incorporated herein by reference.

FIELD

Aspects of embodiments of the present invention relate to a hollow fiber membrane module and a method for preparing the same.

DESCRIPTION OF THE RELATED ART

Hollow fiber membrane modules are classified into a pressurizing type and a dipping type depending on an operation mode thereof. In a pressurizing type filter, only fluid, except for solids such as impurities, sludge, and the like, is allowed to permeate into a hollow through a surface of a hollow fiber membrane by applying pressure to the fluid to be treated.

Although the pressurizing type filter requires separate facilities for fluid circulation, it has an advantage in that the amount of permeated water per unit time is greater than in a dipping type filter. On the contrary, in the dipping type filter, the hollow fiber membrane is directly dipped or immersed into a tank which stores a fluid to be treated, and a negative pressure is applied to the interior of the hollow fiber membrane, thereby allowing only the fluid to be selectively permeated into the hollow through the surface of the hollow fiber membrane, except for solids such as impurities, sludge, and the like. Although the dipping type filter provides a smaller amount of permeated water per unit time than the pressurizing type filter, the dipping type filter has an advantage of reducing costs for facilities and operation by eliminating facilities for fluid circulation.

Both the pressurizing type and dipping type filters may be divided into a both-end water collection type, in which permeated water flowing into the hollow through the hollow fiber membrane is collected by both ends of the hollow fiber membrane, and a single-end water collection type, in which permeated water is collected by one end thereof.

Such a hollow fiber membrane module is prepared by securing a bundle of hollow fiber membranes, having a constant length, to a header. FIGS. 7 and 8 illustrate a comparative process for preparing a hollow fiber membrane module by securing a bundle of hollow fiber membranes 10 to a header 30. The hollow fiber membrane module must be finally treated to have an open end such that one end thereof can be exposed to a fluid. For this purpose, a bundle of hollow fiber membranes 10 is dipped into a gel type fugitive material 50 which can be dissolved in water, and, then, a potting agent 40 is introduced to perform a potting process. Here, the term "bundle of hollow fiber membranes" refers to a plurality of hollow fiber membranes which are not arranged in a constant form. The gel type fugitive material 50 functions to seal an end of the hollow fiber membrane, and allows the end of the hollow fiber membrane to be open by dissolving a gel fluid in water after the potting agent 40 is cured. FIG. 8 illustrates the hollow fiber membrane module after removal of the fugitive material 50.

In this manner, a method for preparing a hollow fiber membrane module includes a potting process in which a module header collecting fluid selectively permeated into the hollow fiber membrane and a bundle of hollow fiber membranes are secured to a water collection unit. If some of the hollow fiber membranes dipped into the potting material are blocked by the potting material, filtration cannot be performed through the hollow fiber membranes and water passage efficiency is deteriorated. Therefore, in the comparative method, there is a need for a process of sealing the end of the hollow fiber membrane, potted into the module header, with a removable material before and after the potting process.

Therefore, there is need for a hollow fiber membrane module, which can be prepared by a simple process without a separate sealing process, while improving water passage efficiency.

SUMMARY

Aspects of embodiments of the present invention are directed to a hollow fiber membrane module and a method for preparing the same. According to aspects of embodiments of the present invention, a hollow fiber membrane module may be prepared by a simple process, have excellent water passage efficiency, and be uniformly potted by arranging hollow fiber membranes at regular intervals. According to another aspect of embodiments of the present invention, preparation efficiency of a hollow fiber membrane module may be improved by minimizing or reducing a curing time and eliminating a sealing process. According to further aspects of embodiments of the present invention, in a hollow fiber membrane module and a method for preparing the same, the hollow fiber membrane module may have increased density of the hollow fiber membranes potted into a header, does not undergo leakage of a potting agent and does not require a sealing or cutting process by eliminating a process of blocking an end of the hollow fiber membrane, and may reduce an amount of the hollow fiber membrane to be discarded.

An aspect of embodiments of the present invention relates to a hollow fiber membrane module. In one or more embodiments, the hollow fiber membrane module includes: a header, and a sheet block inserted into the header, and the sheet block includes a hollow fiber membrane block, wherein the hollow fiber membrane block comprises a plurality of hollow fiber membranes arranged at regular intervals in a vertical direction of the header; and a resin block formed at an end of the hollow fiber membrane block and contacting an inner wall of the header to be secured thereto, and a potting agent is filled between hollow fiber membranes of the hollow fiber membrane block in a space between an upper side of the resin block to an inlet of the header to secure the hollow fiber membranes.

In one embodiment, the resin block may be formed of a thermoplastic resin.

In one embodiment, a space from a lower side of the resin block to an inner surface of the header may form a water collecting section, and hollow fiber membranes of the hollow fiber membrane block protrude into the water collecting section.

In another embodiment, a space from a lower side of the resin block to an inner surface of the header may form a water collecting section, and hollow fiber membranes of the hollow fiber membrane block do not protrude into the water collecting section.

The header may include a protrusion on which a lower side of the resin block is mounted.

The hollow fiber membrane block may include a plurality of hollow fiber membranes arranged at regular intervals in a widthwise direction.

Another aspect of the present invention relates to a method for preparing a hollow fiber membrane module. In one or more embodiments, the method includes: arranging a plurality of hollow fiber membranes in a line to form a sheet in which ends of the hollow fiber membranes are bound to each other via a resin binding portion so as to be separated by a distance (e.g., a predetermined distance) from each other; preparing a plurality of the sheets and stacking the sheets to prepare a sheet block, on which a resin block is formed to have a width ($w_2$) greater than an arrangement width ($w_1$) of the plurality of hollow fiber membranes; inserting the sheet block into a header such that the resin block contacts an inner wall of the header to secure the resin block; and securing the plurality of hollow fiber membranes in a space from an upper side of the resin block to an inlet of the header by potting.

The resin binding portion may be formed in a perpendicular direction with respect to a longitudinal direction of the hollow fiber membrane.

The resin binding portion may be formed of a thermoplastic resin.

The sheet block may be inserted into the header in which a sealing agent is not present.

A distal end of the hollow fiber membrane protruding from the resin block may be cut before the sheet block is inserted into the header.

In the sheet block, a ratio ($w_1$:h) of the arrangement width ($w_1$) of the plurality of hollow fiber membranes to a stack height (h) of the plurality of sheets may be 3:1 to 10:1.

DETAILED DESCRIPTION

Figure 1:
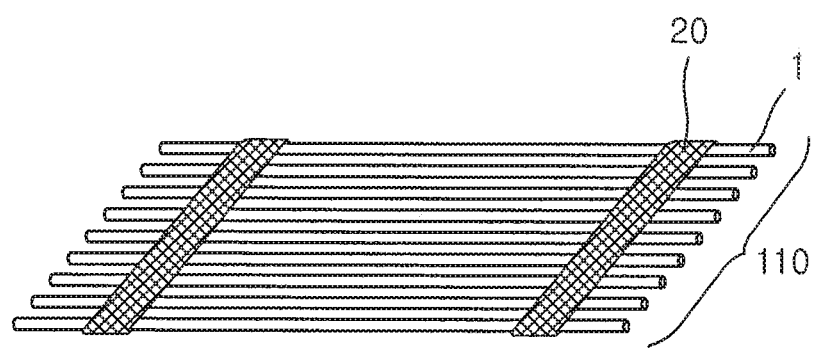
FIGS. 1 to 4 are schematic diagrams illustrating a method for preparing a hollow fiber membrane module, according to an embodiment of the present invention.

Some exemplary embodiments of the present invention are described herein with reference to the accompanying drawings; however, embodiments of the present invention may be embodied in different forms and should not be construed as limited to the embodiments set forth herein. As those skilled in the art would realize, the described embodiments may be modified in various different ways, all without departing from the spirit or scope of the present invention. Accordingly, the drawings and description are to be regarded as illustrative in nature and not restrictive. Likewise, it should be noted that the drawings are not to precise scale and some of the dimensions, such as width, length, thickness, and the like, may be exaggerated for clarity of description in the drawings. Although some elements are illustrated in the drawings for convenience of description, other elements will be easily understood by those skilled in the art. It should be noted that the overall drawings are described from the viewpoint of the observer. It will be understood that when an element is referred to as being "on" or "under" another element, or using other similar terms, the element can be directly formed on or under the other element, or an intervening element(s) may also be present therebetween. In addition, it should be understood that the present invention may be embodied in different ways by those skilled in the art without departing from the scope of the present invention.

Herein, expressions indicating spatial orientations such as "upper (portion)" and "lower (portion)," are to be construed as indicating relative orientations instead of absolute orientations.

FIGS. 1 to 4 are schematic diagrams illustrating a method for preparing a hollow fiber membrane module, according to an embodiment of the present invention. As shown in FIG. 1, hollow fiber membranes 1 of a plurality of hollow fiber membranes 1 are arranged at regular intervals in a line, and ends of the hollow fiber membranes 1 are bound to each other via a resin binding portion 20 to be separated a distance (e.g., a predetermined distance) from each other. In one embodiment, for example, after winding the hollow fiber membranes 1 around a cylindrical roll to be arranged at regular intervals, a first resin binding portion is formed by coating a thermoplastic resin on the hollow fiber membranes 1 in a perpendicular direction with respect to an arrangement direction, and a second resin binding portion is formed by coating the resin on another section of the hollow fiber membranes 1 in the perpendicular direction. The resin is coated to have a coating width greater than an arrangement width ($w_1$) of the plurality of hollow fiber membranes 1 such that the width of the resin binding portion is greater than the arrangement width ($w_1$) of the plurality of hollow fiber membranes 1.

As shown in FIG. 1, when cut along a line between the first and second resin binding portions, a sheet 110, in which the hollow fiber membranes 1 are arranged at regular intervals and are bound at ends thereof to each other by the resin binding portion 20, may be obtained.

The resin binding portion 20 may be formed of a thermoplastic resin. Any resin capable of being compressed upon heating may be applied to the present invention. Examples of the thermoplastic resin may include ethylene vinyl acetate, polyolefin, polystyrene, polycarbonate, polyvinyl chloride, polyamide, and the like, without being limited thereto. In this manner, according to the present invention, since the thermoplastic resin is used as a potting agent instead of a thermosetting resin, there is no need for a curing process, thereby further shortening process time.

To attach the thermoplastic resin to the hollow fiber membranes 1, the thermoplastic resin may be heated above a melting point thereof and compressed.

As used herein, the term "end" does not refer to only an exact distal end of a component, but, rather, includes portions near the distal end. For example, the "end" of a component may include a portion from the exact distal end thereof to a point corresponding to about 10% of the total length of the component.

Figure 2:
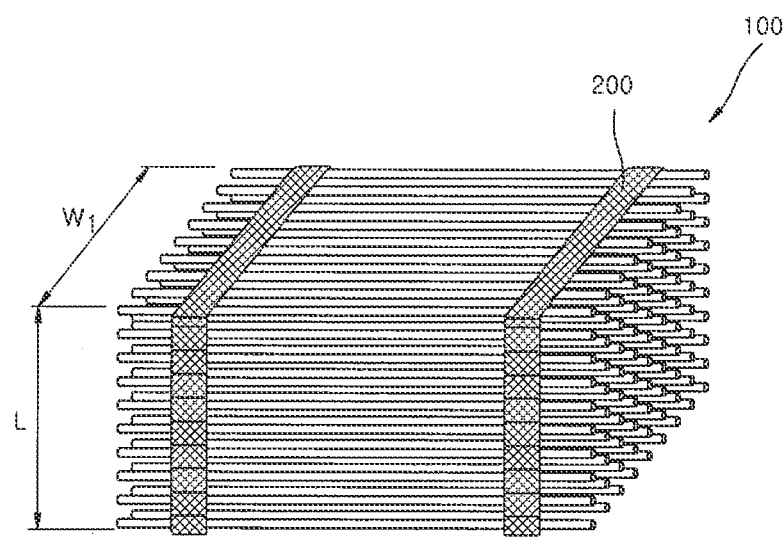

A plurality of sheets 110 is stacked to form a sheet block 100, as shown in FIG. 2. Here, the number of stacked sheets 110 is not particularly limited, and may be determined depending on a width of a header, for example. In one embodiment, for example, about five to about twenty of the sheets 110 may be stacked to form the sheet block 100. However, embodiments of the present invention are not limited thereto. In one embodiment, in the resin block 200, a ratio ($w_1$:h) of the arrangement width ($w_1$) of the plurality of hollow fiber membranes 1 to a stacked height (h) of the sheets may be about 3:1 to about 10:1, and, in one embodiment, is about 4:1 to about 8:1.

Figure 9:
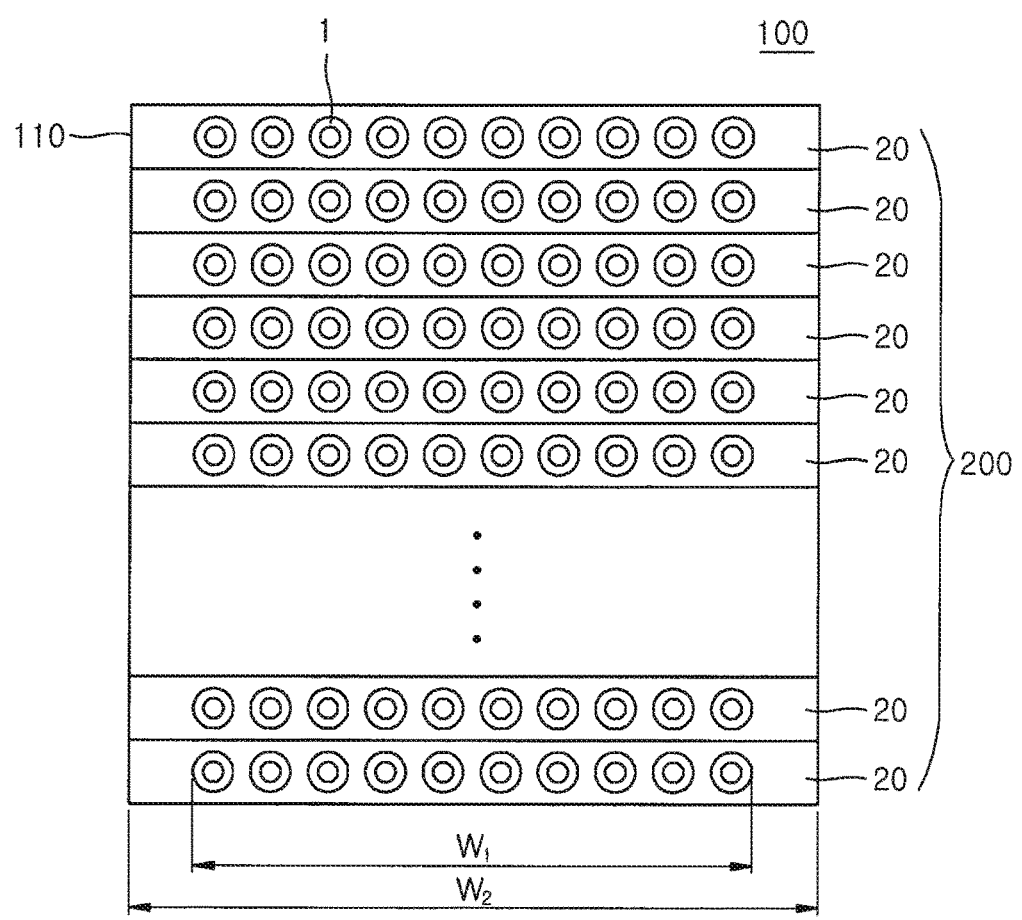
FIG. 9 is a schematic diagram of a surface of a hollow fiber membrane module according to an embodiment of the present invention.

In this manner, with the sheets 110 stacked, the resin binding portions 20 of the sheets are bonded to each other, thereby forming the resin block 200. In addition, after the sheets 110 are stacked, the resin may be further coated such that the sheets are secured to each other. Thus, in one embodiment, a section having the resin block 200 formed thereon has a structure in which the respective hollow fiber membranes 1 are embedded in the resin block 200, as shown in FIG. 9, and a width ($w_2$) of the resin block 200 is greater than the arrangement width ($w_1$) of the plurality of hollow fiber membranes 1.

Figure 3:
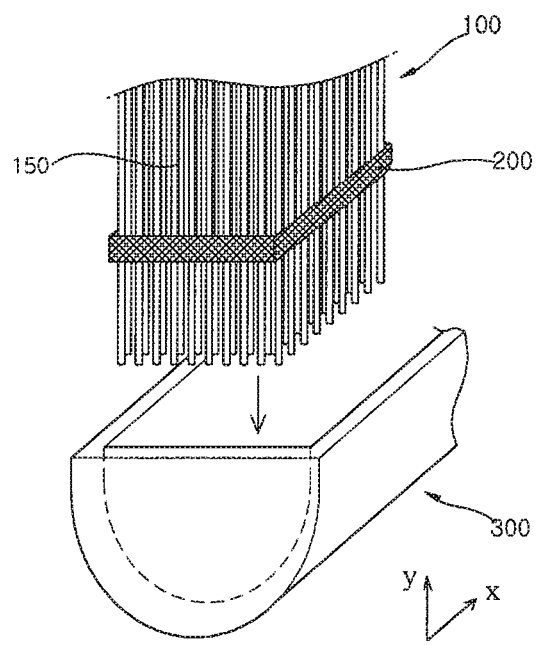
Figure 4:
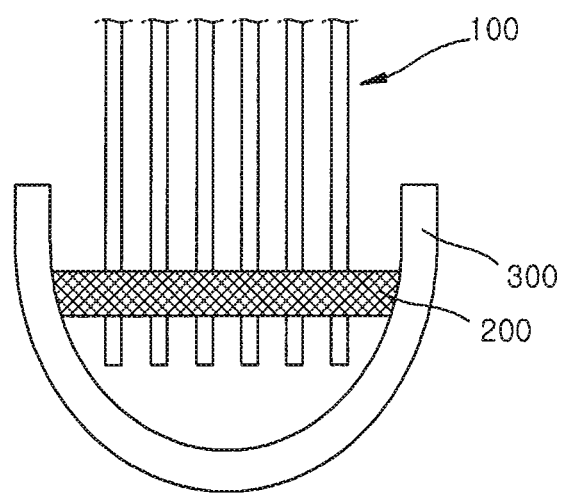
Figure 4:
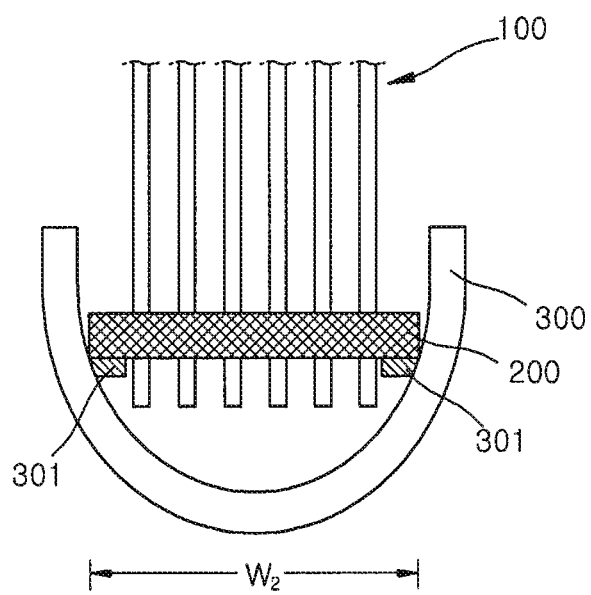

As shown in FIG. 3, the prepared sheet block 100 is inserted into a header 300 in a vertical direction (y-direction) of the header. It should be understood that the present invention is not limited to the shape of the header shown in the drawings. It is desirable that the width of the header is increasingly narrower from an inlet of the header to the center of a bottom thereof.

In one embodiment, the sheet block 100 is inserted into an empty space of the header 300, which is not provided therein with any material, such as a sealing agent or the like, to be removed after potting, and thus, all of the ends of the hollow fiber membranes 1 inserted into the header 300 are open instead of being blocked.

FIGS. 4(a) and (b) are schematic sectional views of a portion where the sheet block 100 is coupled to the header 300. Referring to FIG. 4(a), the resin block 200 contacts an inner wall of the header and is secured thereto. In one embodiment, the resin block 200 has a sufficient width ($w_2$) and a sufficient length such that the resin block 200 is captured by the inner wall of the header and secured thereto. In one embodiment, shown in FIG. 4(b), a bump 301, or protrusion, is formed on the inner wall of the header 300. Referring to FIG. 4(b), as the bump 301 is formed on the inner wall of the header 300, a lower side of the resin block 200 may contact the bump 301, such that the resin block 200 can be more safely or securely mounted.

Figure 5:
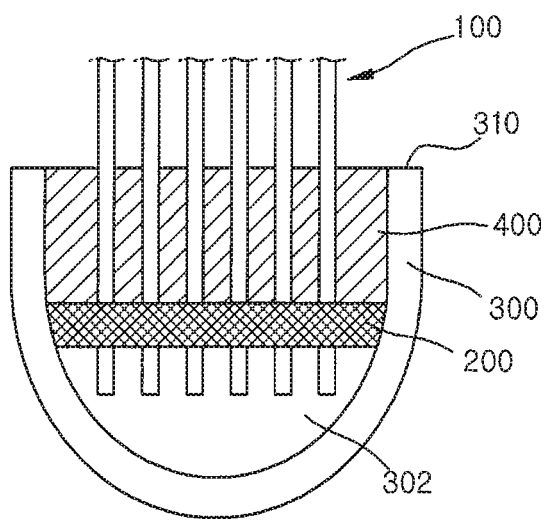
FIG. 5 is a schematic sectional view of a hollow fiber membrane module according to an embodiment of the present invention.

Then, in one embodiment, as shown in FIG. 5, the plurality of hollow fiber membranes 1 may be further secured by injecting a potting agent 400 into a space from an upper side of the resin block 200 to an inlet 310 of the header 300 and curing the same.

In the method for preparing the hollow fiber membrane module according to embodiments of the present invention, since there is no need for a process of sealing the ends of the plural hollow fiber membranes and a process of removing the sealing material before the potting process may thus be eliminated, the number of processes can be minimized or reduced.

A hollow fiber membrane module according to an embodiment of the present invention may be prepared by the above-described method, and includes the header 300 and the sheet block 100 inserted into the header 300. The sheet block 100, in one embodiment, includes: a hollow fiber membrane block 150, wherein the hollow fiber membrane block comprises a plurality of hollow fiber membranes arranged at regular intervals in a vertical direction (y-direction) of the header 300; and the resin block 200 formed at a respective end of the hollow fiber membrane block 150 and contacting an inner wall of the header 300 to be secured thereto. In one embodiment, a space formed between the plurality of hollow fiber membranes 1 from an upper side of the resin block 200 to the inlet 310 of the header 300 is filled with the potting agent 400 to secure the plurality of hollow fiber membranes 1.

The resin block 200 contacts the inner wall of the header 300 and is secured thereto. A portion of each of the hollow fiber membranes 1 from the upper side of the resin block 200 to the inlet 310 of the header 300 is secured by the potting agent 400. Referring to FIG. 5, in one embodiment, the hollow fiber membranes 1 may protrude into a water collecting section 302 formed in a space from a lower side of the resin block 200 to an inner surface of the header 300.

Figure 6:
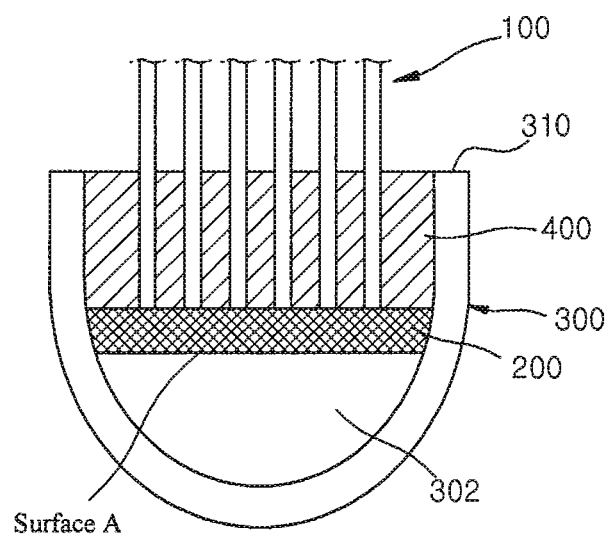
FIG. 6 is a schematic sectional view of a hollow fiber membrane module according to another embodiment of the present invention.
Figure 7:
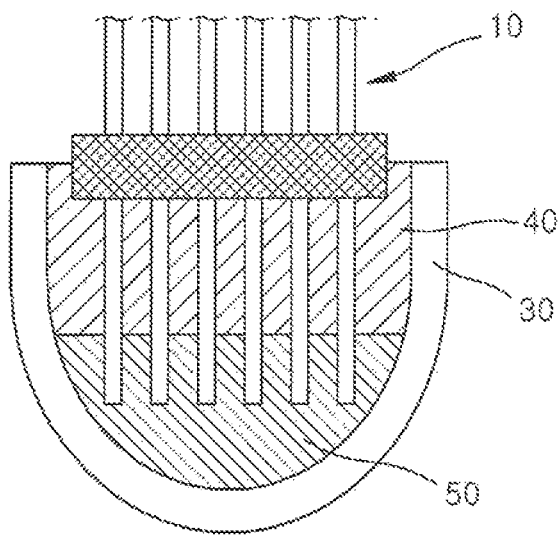
FIGS. 7 to 8 are schematic diagrams of a header combining portion of a comparative hollow fiber membrane module.
Figure 8:
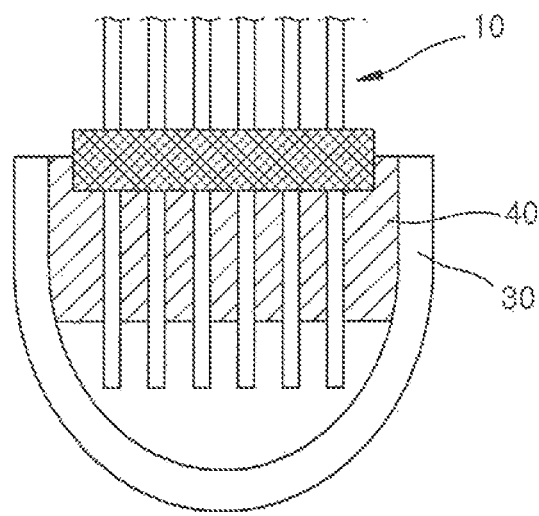

In another embodiment, before inserting the sheet block 100 into the header 300, a portion of the hollow fiber membranes 1 protruding from the resin block 200 may be inserted into the header 300 after being cut out. Referring to FIG. 6, in this case, the hollow fiber membranes 1 may not protrude into the water collecting section 302 formed under the resin block 200.

FIG. 9 is a schematic diagram of a surface (e.g., Surface A shown in FIG. 6) of a hollow fiber membrane module according to an embodiment of the present invention. As shown in FIG. 9, the sheets 110 are stacked (e.g., stacked in a line) to provide a structure in which the hollow fiber membranes 1 are embedded in the resin block 200. In one embodiment, the width ($w_2$) of the resin block 200 formed by stacking the resin binding portions 20 is greater than the arrangement width ($w_1$) of the plurality of hollow fiber membranes 1. As such, according to an embodiment of the present invention, vertical intervals and horizontal intervals between adjacent hollow fiber membranes 1 are substantially constant and uniform, thereby increasing density of the hollow fiber membranes 1, unlike a comparative method in which a bundle of hollow fiber membranes is used for potting.

Although some embodiments of the present invention have been described herein, the present invention is not limited to these embodiments and can be realized in various ways. Further, it should be understood by those skilled in the art that various modifications, variations, and alterations can be made without departing from the spirit and scope of the present invention. Accordingly, these embodiments are given by way of illustration only, and should not be construed in any way as limiting the scope of the present invention, as set forth in the accompanying claims and equivalents thereof.

What is claimed is:

1. A hollow fiber membrane module comprising:
a header; and
a sheet block inserted into the header,
wherein the sheet block includes: a hollow fiber membrane block, wherein the hollow fiber membrane block comprises a plurality of hollow fiber membranes arranged at regular intervals in a vertical direction of the header; and a resin block formed at an end of the hollow fiber membrane block and contacting an inner wall of the header to be secured thereto,
wherein a width of a region of the header is increasingly narrower in a first direction from an inlet of the header toward the center of a bottom thereof, wherein a region of the resin block contacts and is captured by and secured to the inner wall at the region of the header having the increasingly narrower width, the region of the resin block contacting the inner wall being increasingly narrower in the first direction toward a lower side of the resin block and corresponding to the region of the header having the increasingly narrower width, and wherein a potting agent is filled between hollow fiber membranes of the hollow fiber membrane block and fills a space from the region of the resin block contacting the inner wall to the inlet of the header to secure the hollow fiber membranes.

2. The hollow fiber membrane module according to claim 1, wherein the resin block is formed of a thermoplastic resin.

3. The hollow fiber membrane module according to claim 1, wherein a space from the lower side of the resin block to an inner surface of the header forms a water collecting section, and hollow fiber membranes of the hollow fiber membrane block protrude into the water collecting section.

4. The hollow fiber membrane module according to claim 1, wherein a space from the lower side of the resin block to an inner surface of the header forms a water collecting section, and hollow fiber membranes of the hollow fiber membrane block do not protrude into the water collecting section.

5. The hollow fiber membrane module according to claim 1, wherein the header comprises a protrusion on which the lower side of the resin block is mounted.

6. The hollow fiber membrane module according to claim 1, wherein the hollow fiber membrane block comprises a plurality of hollow fiber membranes arranged at regular intervals in a widthwise direction.

7. A method for preparing the hollow fiber membrane module according to claim 1, the method comprising:

arranging hollow fiber membranes of the plurality of hollow fiber membranes in a line to form a sheet in which ends of the hollow fiber membranes are bound to each other via a resin binding portion so as to be separated by a distance from each other;

preparing a plurality of the sheets and stacking the sheets to prepare the sheet block, on which the resin block is formed to have a width greater than an arrangement width of the plurality of hollow fiber membranes;

inserting the sheet block into the header such that the resin block contacts the inner wall of the header to secure the resin block; and securing the plurality of hollow fiber membranes in a space from an upper side of the resin block to the inlet of the header by potting.

8. The method according to claim 7, wherein the resin binding portion is formed in a perpendicular direction with respect to a longitudinal direction of the hollow fiber membrane.

9. The method according to claim 7, wherein the resin binding portion is formed of a thermoplastic resin.

10. The method according to claim 7, wherein the sheet block is inserted into the header in which a sealing agent is not present.

11. The method according to claim 7, wherein a distal end of the hollow fiber membrane protruding from the resin block is cut before the sheet block is inserted into the header.

12. The method according to claim 7, wherein a ratio of the arrangement width of the plurality of hollow fiber membranes to a stack height of the plurality of sheets is about 3:1 to about 10:1 in the sheet block.

13. The hollow fiber membrane module according to claim 1, wherein the region of the resin block that is increasingly narrower in the first direction directly contacts the inner wall.

14. The hollow fiber membrane module according to claim 1, wherein a sealing agent is not provided in a space between the region of the resin block that is increasingly narrower in the first direction and the inner wall.

15. The hollow fiber membrane module according to claim 2, wherein the thermoplastic resin does not require a curing process, and the potting agent is cured.

16. The hollow fiber membrane module according to claim 2, wherein the thermoplastic resin comprises at least one of ethylene vinyl acetate, polyolefin, polystyrene, polycarbonate, polyvinyl chloride, or polyamide.

* * * * *